(12) United States Patent
Dobbek et al.

(10) Patent No.: US 6,219,198 B1
(45) Date of Patent: Apr. 17, 2001

(54) STATE ESTIMATOR ALTERATION FOR ODD SAMPLE TIMES IN A DISK DRIVE SERVO CONTROL SYSTEM

(75) Inventors: Jeffrey Joseph Dobbek, San Jose; Peter Kui Ho, Morgan Hill; Louis Joseph Serrano, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/115,484

(22) Filed: Jul. 14, 1998

(51) Int. Cl.$^7$ ................................................. G11B 5/596
(52) U.S. Cl. ........................................ 360/78.04; 360/78.09
(58) Field of Search ............................. 360/53, 51, 78.09, 360/78.04, 78.14, 77.08, 77.04, 75

(56) References Cited

U.S. PATENT DOCUMENTS

| | | |
|---|---|---|
| 4,133,011 | 1/1979 | Kurzweil, Jr. . |
| 4,679,103 | 7/1987 | Workman . |
| 4,724,370 | 2/1988 | Moraru et al. . |
| 4,775,903 | 10/1988 | Knowles . |
| 4,816,941 | 3/1989 | Edel et al. . |
| 4,835,632 | 5/1989 | Shih et al. . |
| 4,982,297 | 1/1991 | Tsujisawa . |
| 5,089,757 | 2/1992 | Wilson . |
| 5,132,854 | 7/1992 | Tsuyoshi et al. . |
| 5,202,821 | 4/1993 | Bauck et al. . |
| 5,206,570 | 4/1993 | Hargarten et al. . |
| 5,208,710 | 5/1993 | Uno . |
| 5,241,433 | 8/1993 | Anderson et al. . |
| 5,270,880 | 12/1993 | Ottesen et al. . |
| 5,313,340 | * 5/1994 | Takayama et al. ................ 360/51 X |
| 5,381,282 | 1/1995 | Arai et al. . |
| 5,383,068 | 1/1995 | Shimizu et al. . |
| 5,392,290 | 2/1995 | Brown et al. . |
| 5,576,909 | 11/1996 | Dierkes et al. . |
| 5,940,239 | * 8/1999 | Lee et al. ...................... 360/78.09 X |
| 5,959,797 | * 9/1999 | Imai et al. .................... 360/78.14 X |

FOREIGN PATENT DOCUMENTS

| | | |
|---|---|---|
| 2-73568 | 3/1990 | (JP) . |
| 2-219483 | 9/1990 | (JP) . |
| 5-260779 | 10/1993 | (JP) . |

* cited by examiner

*Primary Examiner*—Alan T. Faber
(74) *Attorney, Agent, or Firm*—Abdy Raissinia

(57) ABSTRACT

A direct access storage device (DASD) servo control system includes a servo controller that makes an estimate of disk actuator arm position and velocity as for a regular, expected PES signal sample time, and then alters the estimate for an odd sample time using a simplified estimation function. The altered estimate is generated after determining the amount of time by which the odd sample time is longer than the regular sample time. An odd sample time event is recognized and the odd sample time is forced longer than the regular sample time by skipping a disk control signal computation interval. In this way, the estimated position and velocity of the disk arm is improved for odd sample times, even where the change in one PES sample time may be unrelated to the change in any subsequent PES sample times.

26 Claims, 4 Drawing Sheets

STATE ESTIMATOR ALTERATION FOR ODD SAMPLE TIMES IN A DISK DRIVE SERVO CONTROL SYSTEM

BACKGROUND OF THE INVENTION

1. Field of the Invention

This invention relates generally to direct access storage devices and, more particularly, to control of arm movement in disk drive devices.

2. Description of the Related Art

In a conventional computer data storage system having a rotating storage medium, such as a magnetic or magneto-optical disk, data is stored in a series of concentric or spiral tracks across the surface of the disk. A magnetic disk, for example, can comprise a disk substrate having a surface on which a magnetic material is deposited. The digital data stored on a disk is represented as a series of variations in magnetic orientation of the disk magnetic material. The variations in magnetic orientation, generally comprising reversals of magnetic flux, represent binary digits of ones and zeroes that in turn represent data. The binary digits must be read from and recorded onto the disk surface. A read/write head produces and detects variations in magnetic orientation of the magnetic material as the disk rotates relative to the head.

Conventionally, the read/write head is mounted on a disk arm that is moved across the disk by a servo. A disk drive servo control system controls movement of the disk arm across the surface of the disk to move the read/write head from data track to data track and, once over a selected track, to maintain the head in a path centered over the selected track. Maintaining the head centered over a track facilitates accurate reading and recording of data. Positioning read/write heads is one of the most critical aspects of recording and retrieving data in disk storage systems. With the very high track density of current disk drives, even the smallest head positioning error can potentially cause a loss of data that a disk drive customer wants to record or read. Accordingly, a great deal of effort is devoted to servo control systems.

A servo control system generally maintains a read/write head in a position centered over a track by reading servo information recorded on the disk surface. The servo information comprises a position-encoded servo pattern of high frequency magnetic flux transitions, generally flux reversals, that are pre-recorded in disk servo tracks. The flux transitions are recorded as periodic servo pattern bursts formed as parallel stripes in the servo tracks. When the read/write head passes over the servo pattern flux transitions, the head generates an analog signal whose repeating cyclic variations can be demodulated and decoded to indicate the position of the head over the disk. The position indicating information can be used to produce a corrective signal that is referred to as a position error sensing (PES) signal. The PES signal indicates which direction the head should be moved to remain centered over a selected track and properly read and write data.

In the sector servo method of providing servo track information, each disk surface is divided into angularly-spaced sectors, with each sector containing both pre-recorded servo track information and customer data. Typically, the tracks on a sector servo disk surface are partitioned by having a short servo track information area followed by a customer data area. The servo track information area typically includes a sector identification marker, track identification data, and a servo burst pattern. The sector marker indicates to the data read/write head that servo information immediately follows in the track. In a sector servo system, the servo read head is typically the same head used for reading data.

Some servo control systems include an estimator that predicts the velocity and position of the disk arm actuator during a servo control signal computation interval, based on the PES signal. The estimator implements a state estimator function that includes constant terms for system parameters such as drive motor torque factor, disk arm inertia, computation delay, arm pivot-to-head distance, sample time, and the like, along with variable terms for PES signal gain, PES sampling time, and the like. Typically, the magnitude of the constant terms is determined by the design of the disk drive system and their value is never altered during the calculation of the estimator function. The estimator is often implemented as part of the servo controller.

One of the estimator function constant terms is a time value for sampling of the PES signal. That is, conventional estimator design assumes that the PES signal sampling is regularly spaced in time. Under certain conditions, this may not be true. For example, the drive motor that rotates disks may have a speed accuracy tolerance of plus or minus 3%. A variation in drive motor speed results in a variation in the rate at which PES samples are received. If a constant PES sampling time value is assumed in the estimator function, and the sampling time is changing, then the estimator output will produce a servo control signal that may be erroneous whenever the drive motor speed varies from its nominal value.

It is known to use an actual PES sampling time for one servo control signal computation interval to modify the estimator function constants for subsequent computation intervals. Such a system is described, for example, in U.S. Pat. No. 4,816,941 to S. Edel and I. Van Pham. In the '941 patent, certain estimator function constant terms that are derived from the PES sampling time are modified with the actual PES sampling time value from a preceding computation interval. In this way, these particular constant terms of the estimator function are updated with actual PES sampling time data. This type of modification to the estimator function is especially suited to the situation where the PES sampling time interval is changing because the drive motor speed is varying, because in this situation, the change in one sample time period is related to the change in the very next sample time period.

There may be other situations in which the PES sampling times are not regular, and in which the change in one sample time interval is not related to the change in the next sample time interval. For example, in a multiple-disk, multiple-head disk drive system, a read or write operation may require a head switch, moving from a head that is over one disk surface to a head that is over a different disk surface. If the respective disk sectors are not aligned in time from surface to surface, then consecutive PES signal sample times will not be uniform. Another situation in which PES signal samples may not be uniform is for a disk drive with a sample rate that varies from disk surface to disk surface. Irregular PES samples also may occur with a disk drive in which the servo sectors are not radially aligned. In these situations, a prior PES sample time interval may be unrelated to the subsequent PES sample time interval. Thus, different estimator constants may be affected and the technique described in the '941 patent may not be suitable.

Each situation in which the PES sample time is different from the expected uniform or regular sample time is called an "odd" sample time. Even one odd sample time can result in a misprediction of disk arm velocity and position, and can be extremely deleterious if it happens while the actuator arm is moving at a high velocity.

From the discussion above, it should be apparent that there is a need for a disk drive servo control estimator that can provide velocity and position predictions with improved accuracy, considering odd sample times. The present invention fulfills this need.

SUMMARY OF THE INVENTION

The present invention provides a direct access storage device (DASD) with a servo control system having a servo controller that estimates disk actuator arm position and velocity as for a regular, expected PES sample time, and then alters the estimate for an odd sample time using a simplified estimation function. The altered estimate is generated after determining the amount of time by which the odd sample time is longer than the regular sample time. The odd sample time is determined with relative precision by skipping a disk control signal computation interval. A computation interval is skipped either by intentionally ignoring a sector identification (SID) mark that ordinarily indicates a new computation interval, or by unintentionally missing an SID mark, discovering the miss, and using the next mark as the computation interval signal. Intentionally ignoring an SID mark can be performed if it is known that an event producing an odd sample time is to occur, such as a head switch. If an SID mark is unintentionally missed, an odd sample time interval can be measured with sufficient precision for the simplified estimation function. Thus, the simplified odd sample time estimation can be used when a disk head switch occurs, or where servo sectors on multiple disks are not radially aligned, in conjunction with a simplified estimation function. In this way, the estimated position and velocity of the disk arm are improved for odd sample times.

A simplified estimation function can be used because control delay need not be factored into the estimated position and velocity, due to the fact that the control delay is already accounted for in the first regular or "normal" sample time prediction. Thus, because the length of time of the odd sample time interval is known, the simplified estimation function can be used for predicting velocity and position in cases where the prior sample time is unrelated to the odd sample time.

Other features and advantages of the present invention should be apparent from the following description of the preferred embodiment, which illustrates, by way of example, the principles of the invention.

DESCRIPTION OF THE PREFERRED EMBODIMENT

Figure 1:
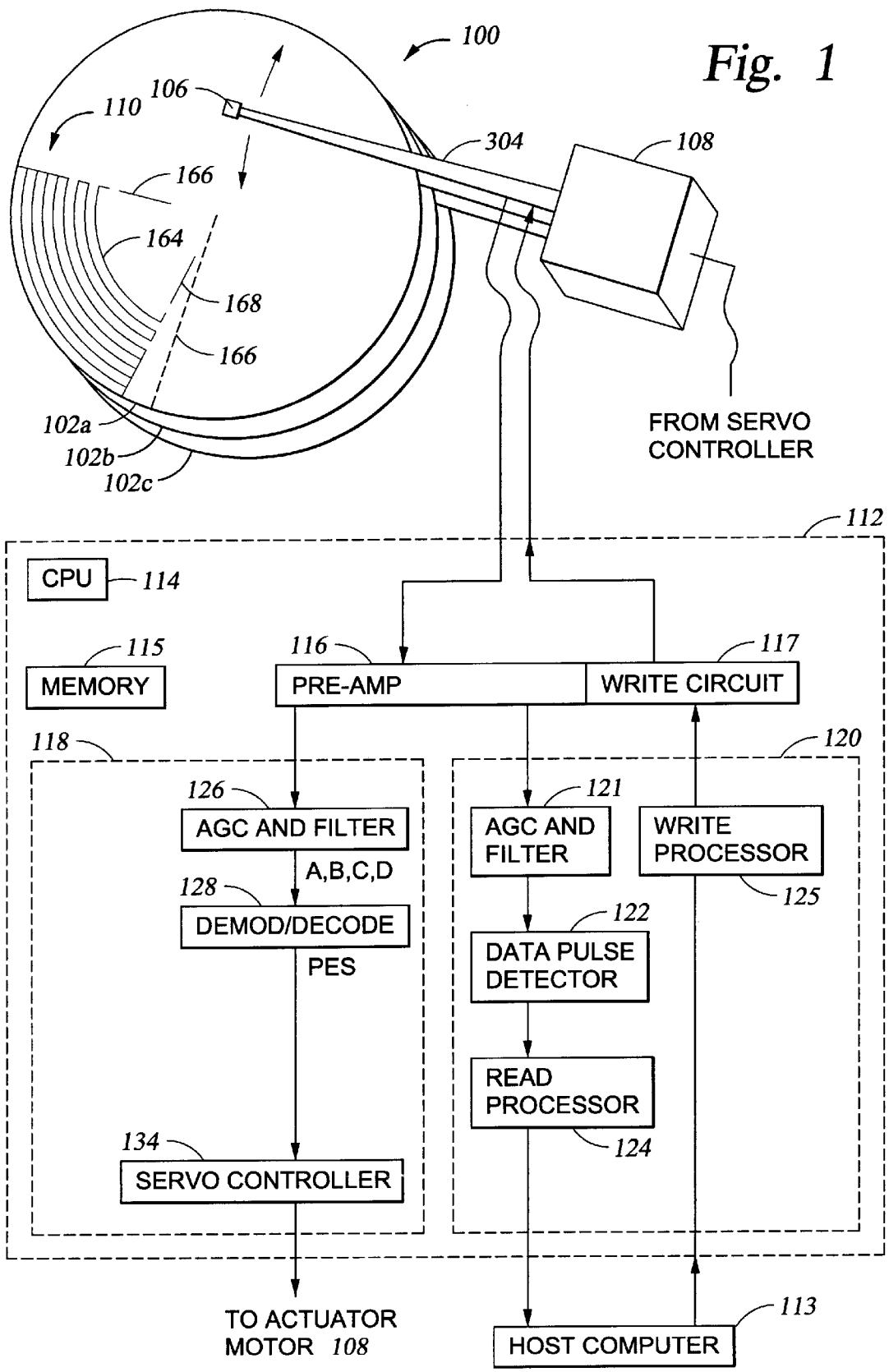
FIG. 1 is a schematic block diagram representation of a disk drive storage system constructed in accordance with the present invention.

FIG. 1 illustrates an exemplary direct access storage device (DASD) 100 comprising a disk drive constructed in accordance with the present invention. The DASD includes multiple disks 102a, 102b, 102c whose top surfaces are shown and on which are deposited a magnetic recording material for storing magnetically encoded information. It should be understood that the bottom surfaces of the disks have a similar construction. Although three disks are indicated in FIG. 1, it should be understood that the invention has applicability to disk drive systems with any number of disks consistent with the following description of operation. A reference to a single disk 102 should be understood to be a reference to the disks collectively. Moreover, where the device 100 is described with respect to one of the disks for ease of explanation, it should be understood that the description applies to each of the disks.

In accordance with the invention, read/write heads are moved across the disks 102 according to a sector servo control system wherein the disks are divided into radial segments comprising servo information areas and customer data areas. The servo information areas contain a prerecorded servo pattern, and the customer data areas are used for recording and reading user data. A position error sensing (PES) signal is generated using the servo readback signal from the servo information areas.

Figure 2:
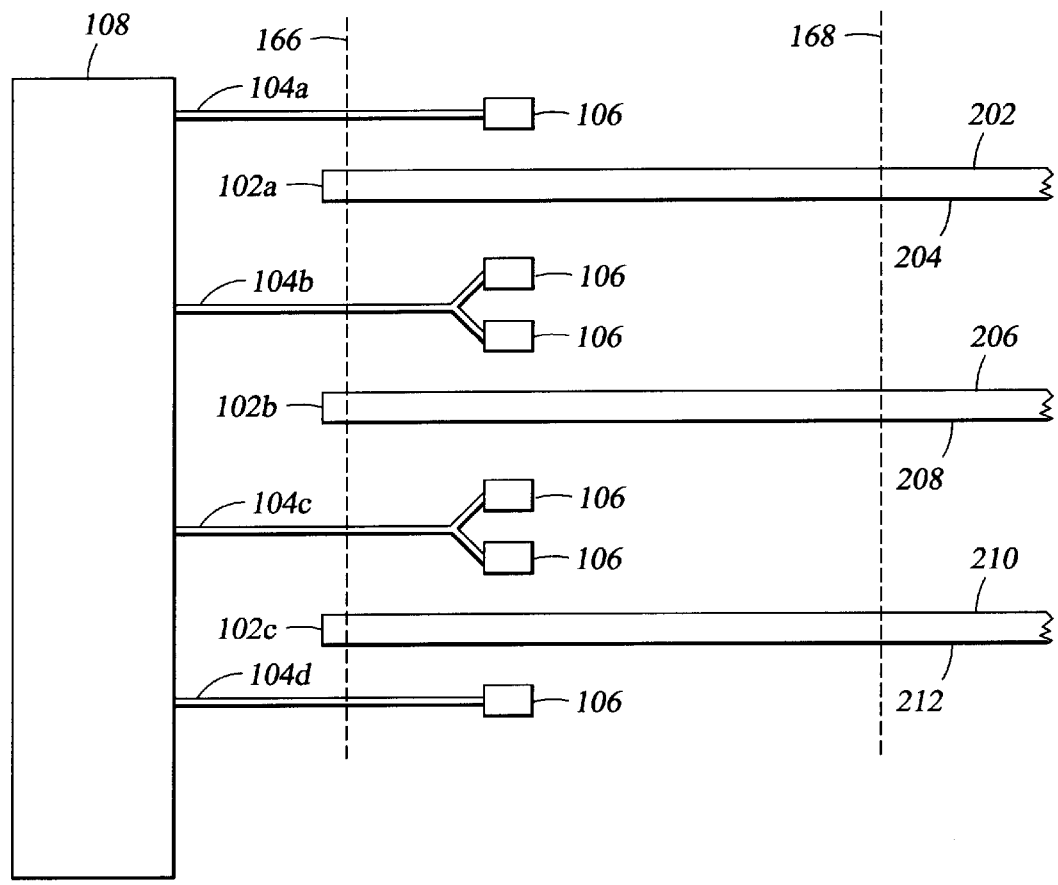
FIG. 2 is side elevational view of the disk surfaces and arms in the disk drive storage control system illustrated in FIG. 1.

The exemplary system 100 is a sector servo system having three disks arranged in a coaxial fashion. Each disk has a top surface and a bottom surface, and so the three-disk system has six surfaces on which information can be recorded. FIG. 2 is a side elevation view of these surfaces. Thus, the first disk 102c has a top surface 202 and a bottom surface 204. The second disk 102b has surfaces 206, 208 and the third disk has surfaces 210, 212. The system 100 makes use of some actuator arms that have double-suspension read/write heads, and therefore all six surfaces 202–212 can be accessed with a total of only four arms, as shown in FIG. 2. The separation of disks and heads is exaggerated in FIG. 2 for clarity of presentation. As with the disks 102, the four arms 104a, 104b, 104c, 104d will be referred to collectively with one reference numeral 104. Each disk surface is provided with a read/write head 106 for transducing recorded information from the disk surfaces and for recording information onto the disk surfaces. An actuator motor 108 pivots all of the actuator arms 104 simultaneously, thereby changing the position of all the read/write heads 106 across the disks 102. The actuator motor is typically constructed as a voice coil motor (VCM).

Returning to FIG. 1, the first disk 102a is shown with concentric tracks 110 of information. Movement of the disk arms 104 is indicated by the arrows extending across the disk. Although rotary movement of the arms 104 is depicted for illustrative purposes, the disk drive system 100 may alternatively use another positioning scheme, such as linear extension/retraction of the arms. In FIG. 1, parallel circular lines 164 represent tracks of the disk, and dashed radial lines 166 represent sector-defining lines.

A sector servo information area is defined in the area of a sector between a sector line 166 and a delimiting line 168 located toward one radial edge of the sector. In alternative embodiments, the dashed radial lines 166 and 168 may be curved. Servo track information is recorded in the sector servo information area, and customer data can be recorded in the disk area corresponding to the remainder of the sector. The servo track information includes a sector identification (SID) marker, track identification data, and a servo burst pattern. The SID marker indicates to the read/write head that servo information follows immediately in the track.

The operation of the disk drive 100 is managed by a disk drive controller 112, which also serves as an interface between the disk drive 100 and a host computer 113. The host computer may comprise, for example, a desktop computer, a laptop computer, a mainframe computer, or any other digital processing device for which storage of data on a disk is desired. The disk drive controller 112 includes a central processor unit (CPU) 114 that executes program instructions stored in controller memory 115 to implement the desired operation.

In particular, the disk drive controller 112 estimates disk actuator arm position and velocity of the disk actuator arms 104 according to regularly received PES signal samples and produces control signals that keep the heads 106 tracking along the center of the disk tracks 110. The estimated head position and velocity are used to modify the arm control signals and achieve more accurate tracking. In accordance with the invention, odd sample times are initiated and used to produce estimated position and velocity using a simplified estimation function. The altered estimate is generated after determining the amount of time by which the odd sample time is longer than the regular sample time. In the preferred embodiment, the odd sample time is initiated by skipping a disk arm control signal computation interval, thereby extending the "normal" PES sample time interval by a predetermined time. This technique improves on prior systems that could estimate position and velocity of the disk arm primarily where the changes in one PES sample time were related to changes in subsequent PES sample times, such as changes in drive motor speed.

In the preferred embodiment of FIG. 1, the disk drive controller 112 includes a readback signal pre-amplifier circuit 116 ("pre-amp"), which receives electrical representations of servo patterns sensed by the read/write heads 106 from the disks 102. The pre-amp 116 serves a dual purpose by amplifying either data signals or servo signals, depending on whether the associated read/write head 106 is positioned over stored customer data or over servo pattern data, respectively. Thus, the amplified signal from the pre-amp 116 is directed to two processing channels: a servo channel 118 and a customer data channel 120. A write circuit 117 is provided to supply the read/write heads 106 with customer data signals from the data channel 120.

The servo channel 118 generally functions to read servo data from the disks 102 to aid in properly positioning the read/write heads 106. When operating in conjunction with the servo channel 118, the pre-amp 116 amplifies servo signals produced when a read/write head 106 senses servo patterns. For a typical quadrature servo pattern, the readback signal from the head comprises transduced A, B, C, D servo patterns known to those skilled in the art. The servo channel 118 includes an automatic gain control (AGC) and filter circuit 126, which may comprise any one of various known circuits for automatically adjusting the readback signal gain and filtering it. The output of the AGC and filter circuit comprises processed A, B, C, D servo data. Next, a demodulator/decoder 128 receives the processed readback signal and derives P and Q quadrature data from which a position error sensing (PES) signal is generated. Those skilled in the art will understand how to derive the P and Q data and generate the PES signal without further explanation. Those skilled in the art will also understand that the PES signal is related to the position of a read/write head 106 with respect to the desired track center and is indicative of the read/write head position error.

The data channel 120 generally reads and writes data to and from the disks 102 in response to requests from the host computer 113 to read or write the customer data. The write circuit 117 is connected only to the customer data channel 120. The pre-amp 116, when operating in conjunction with the customer data channel, amplifies the disk readback signal from the read/write head 106 and directs the readback signal to an automatic gain control and filter circuit 121. A data pulse detector 122 receives the analog readback signal from the circuit 121 and forms digital data pulses corresponding to the analog signal from the circuit 121. Next, a read processor 124 converts the data pulses into formatted data strings that are compatible with the host computer 113.

The components of the data channel 120 also operate in reverse order to write data to the disks 102. That is, to write data to a disk, the host computer 113 sends data to the data channel 120, where they are received by the write processor 125. The write processor formats the data and provides it to the write circuit 117, where the formatted data is recorded onto the disk 102 by the head 106.

Figure 3:
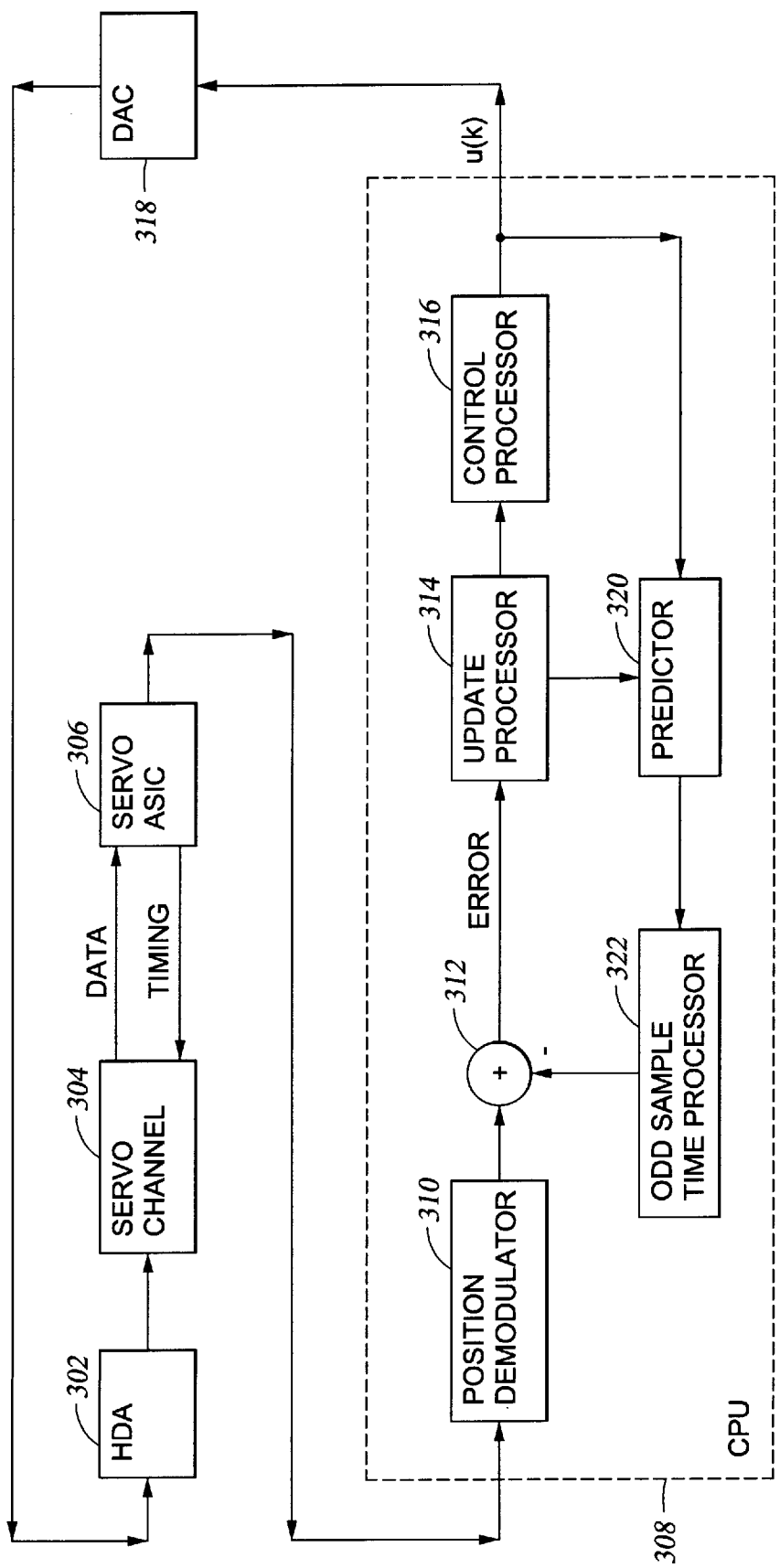
FIG. 3 is a process flow diagram that illustrates the operations performed by the servo control system of FIG. 1.

FIG. 3 is a process flow diagram that illustrates the control signal flow implemented by the direct access storage device (DASD) of FIG. 1. A control current signal is received at the actuator arm motor of a head drive assembly (HDA) 302, which includes the arm, head, and actuator arm motor (VCM) described above in conjunction with FIG. 1. The read/write head of the HDA produces the servo readback signal, which is provided to the servo channel 304. Details of the servo channel control processing elements correspond to the FIG. 1 servo channel 118. Thus, the processing of the servo channel 304 includes gain control, signal peak detection, and demodulation into a PES signal.

Data pulses corresponding to the demodulated PES signal are provided from the data channel 304 to a servo control application specific integrated circuit (ASIC) chip 306, which in the preferred embodiment implements a servo controller that operates in accordance with the invention. The servo ASIC 306 detects identification information for the disk servo sector, decodes gray code information corresponding to track number, records servo signal sample burst values, and records sector and head identification information for position control processing. The servo ASIC also provides timing signals back to the servo channel 304 to control PES signal sampling intervals. For example, the servo ASIC detects servo identification (SID) marks, which signify the beginning of a "normal" servo computation interval.

The data produced by the servo ASIC 306 is processed by the central processing unit (CPU) 308 of the DASD (see FIG. 1). The processing elements described for the CPU are implemented in the preferred embodiment by programming stored in CPU memory, but also can be implemented in hard-wired circuitry. The data from the servo ASIC is received according to regular signal sample time intervals whose duration are dependent on the DASD design parameters. During the disk control signal computation interval between sample times, the regular signal samples are first processed by a position demodulator 310 to produce measured position information that indicates position of the read/write head relative to the storage media of the HDA. A summer 312 receives the measured position information and predicted position information, from which an error signal is produced. The error signal is received by an update processor 314, which calculates an updated head position and head velocity in accordance with known functions and techniques.

From the update processor 314, a servo control signal processor 316 generates a servo control signal, commonly represented as "U(k)", that is provided to the actuator arm VCM of the HDA 302, after first passing through a driver 318 that includes a digital-to-analog converter (DAC). The servo control signal also is provided to a position and velocity predictor 320, which also receives the updated head position and velocity information from the update processor 314. The predictor 320 performs computations to calculate predicted head position and velocity in accordance with known equations and techniques. Such processing is described, for example, in U.S. Pat. No. 4,679,103 issued Jul. 7, 1987 to M. Workman entitled Digital Servo Control System for a Data Recording Disk File. This description is incorporated herein by this reference.

When an odd sample time event occurs, such as for a disk head change or the like, an odd sample time processor 322 calculates predicted head position and velocity by assuming or initiating an odd sample time interval having a duration that is longer than a normal sample time interval by a positive amount. With the odd sample time interval, the odd sample time processor estimates predicted head position and velocity with a simplified estimation function that ignores control delay terms that otherwise would be calculated.

The odd sample time processor 322 can receive information from the servo controller 134 (see FIG. 1), for example, to determine that an odd sample time event such as a head switch is to occur, and thereby can intentionally ignore the next SID mark so that an odd sample time interval (equal to two "normal" sample time intervals) occurs. This permits the simplified estimation function to be used.

If desired, an odd sample time interval can be greater than two normal sample time intervals. Alternatively, the odd sample time processor can receive information from the servo controller that a time interval greater than a "normal" sample time interval has passed since the previously detected SID mark was detected. This indicates an (unintentional) odd sample time event has occurred. The elapsed time until the next detected SID mark can be measured by the odd sample time processor, using known timing circuits. This produces a measured odd sample time interval and permits the simplified estimation function to be used.

The simplified estimation function used by the odd sample time processor 322 calculates predicted head position using terms comprising prior predicted head position $X1B_P$, prior predicted head velocity $X2B_P$, the positive amount of time $T_{odd}$ by which the odd sample time interval is longer than a normal sample time interval, an acceleration factor Ka, and the head control signal U from the prior sample time interval. The simplified position calculation is given by Equation [1] listed below.

$$X1B = X1B_P + X2B_P \times T_{odd} + \frac{1}{2} \times T_{odd}^2 \times Ka \times U \quad [1]$$

The simplified estimation function for the predicted head velocity calculates predicted head velocity using terms comprising prior predicted head velocity X2B, the amount of time $T_{odd}$ by which the odd sample time interval is longer than a normal sample time interval, an acceleration factor Ka, and the head control signal U from the prior sample time interval. The simplified velocity calculation is given by Equation [2] listed below.

$$X2B = X2B_P + T_{odd} \times Ka \times U \quad [2]$$

In the preferred embodiment, the odd sample time interval is initiated by skipping a normal sample time interval such that the odd sample time interval extends over more than one normal sample time interval. As noted above, skipping a normal sample time interval can detecting a data mark but ignoring it, or being unable to detect a servo mark. That is, skipping may involve detecting the sector identification (SID) mark that ordinarily signifies a normal sector computation interval, but ignoring it, in those conditions where the servo controller is aware that an odd sample time event will occur. This forces an extended "odd" sample time interval and initiates the simplified position and velocity prediction processing of the invention.

Alternatively, skipping a normal sample time interval may involve failing to detect an SID mark, discovering the failed detection, and then waiting for the next SID mark to define an odd sample time. Such unintentional skipping may be discovered, for example, by starting a timer upon detecting an SID mark. The approximate length of a normal sample time interval is known. Therefore, after a time equal to a normal sample time interval has passed without detection of an SID mark, the servo controller can assume that the system has failed to detect the next SID mark. When this occurs, the next SID mark can be detected and then processing for the odd sample time interval, with the simplified estimation, can be implemented. Thus, the estimator 322 can calculate predicted position and velocity that are used to produce an updated position and velocity number from the update processor 314, and can perform such calculations using simplified equations given above by Equation [1] and Equation [2].

The simplified estimation functions can be used, in the case of the odd sample times, because control delay need not be factored into the estimated head position and velocity, due to the fact that the control delay is already accounted for in the first regular or "normal" sample time prediction. The odd sample time can be forced longer than the regular sample time, and can be determined with relative precision, by skipping a disk control signal computation interval as described above. Because the odd sample time interval is known, the simplified estimation function can be used for predicting velocity and position in cases where the prior sample time is unrelated to the odd sample time.

The simplified estimation function skips several terms, such as those related to control delay. Among the terms skipped are actuator arm motor windage, which is assumed to be DC and therefore need not be re-predicted, and VCM coil current, which need not be predicted if the coil rise time is sufficiently quick or the control slew time is sufficiently small. To make the simplified calculation, the most important factor is for the value of $T_{odd}$ to be known (predetermined or measured) prior to the next control signal computation interval, which as described above is forced to a positive value by skipping a computation interval.

In the preferred embodiment, processing of data received by the servo control ASIC 306 from the servo channel 304 is performed by the central processing unit (CPU) 308 of the DASD. Alternatively, the processing described in FIG. 3 for the CPU can be incorporated into the servo control ASIC 306.

Figure 4:
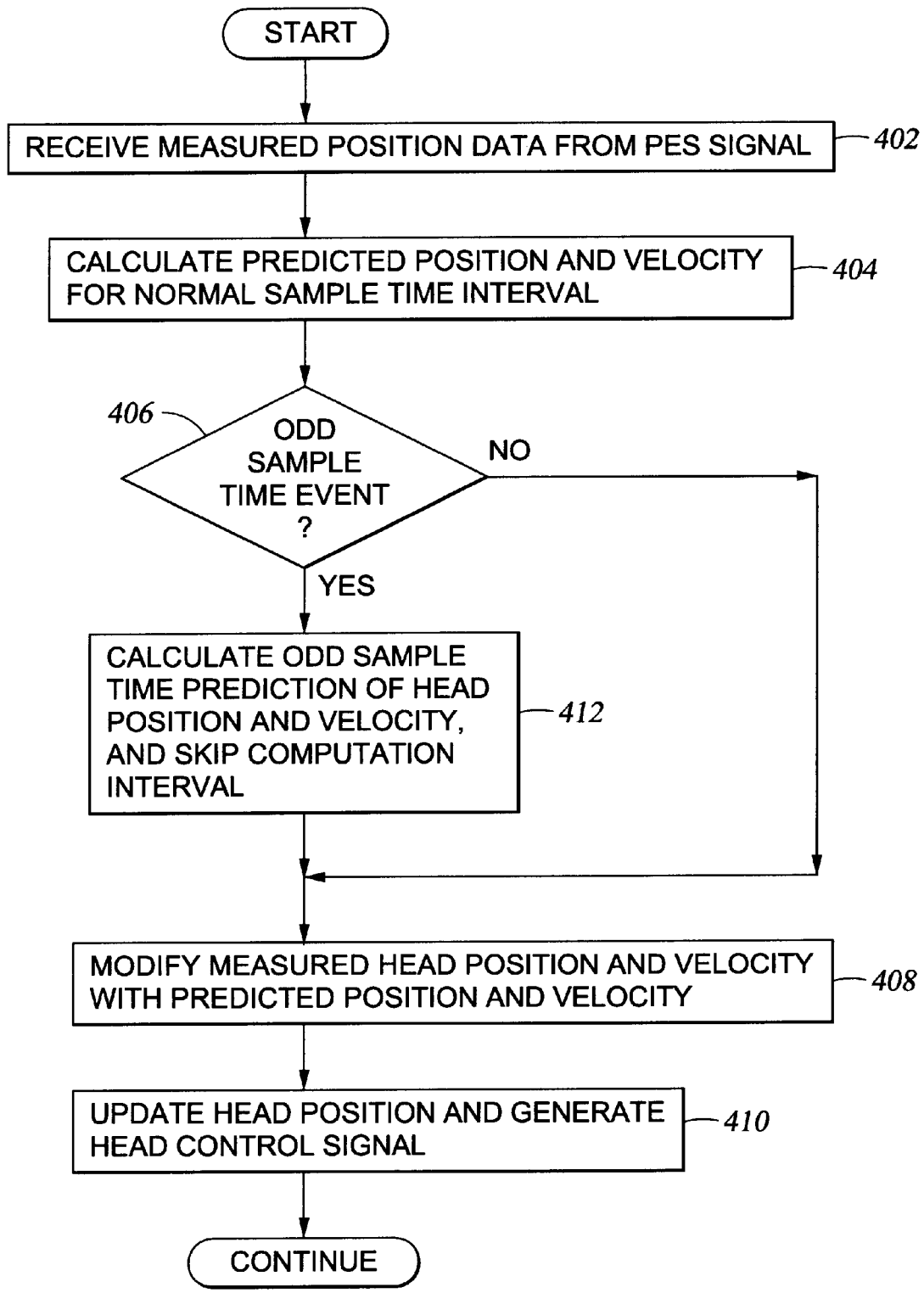
FIG. 4 is a flow diagram that illustrates the steps performed by the servo control system of FIG. 1.

FIG. 4 is a flow diagram that illustrates the processing steps carried out by the servo processor of the preferred embodiment in performing head position and velocity prediction for odd sample times. In the first processing step, represented by the flow diagram box numbered 402, the servo controller CPU receives the measured head position and velocity information. The servo controller next calculates predicted head position and velocity for a normal sample time interval. This processing is represented by the flow diagram box numbered 404.

If there is no odd sample time event, indicated by the "NO" outcome of the decision box numbered 406, then the CPU modifies the measured position with the predicted head position and velocity calculated to produce an error term. The modification is represented by the flow diagram box numbered 408, which is analogous to the operation of the summer illustrated in FIG. 3. The error term is then used to update the head position and velocity, as represented by the flow diagram box numbered 410.

If there is an odd sample time event, such as a head switch or servo sector change or if an SID mark is missed, then different processing occurs. The odd sample time event corresponds to the "YES" outcome of the decision box 406. Thus, the servo controller of the preferred embodiment recognizes when an odd sample time event occurs. For an odd sample time event, the servo processor calculates an odd sample time prediction and skips a sample time computation interval during which it otherwise would provide predicted head position and velocity information. This processing is represented by the flow diagram box numbered 412. At the end of the extended sample time computation interval, the odd sample time prediction for head position and velocity is used to modify the measured position and velocity to produce the error term at the box numbered 408. The updated head position and velocity are then calculated, as indicated by the flow diagram box numbered 410. Servo processing then continues.

As described above for the preferred embodiment, the present invention provides a servo control system having a servo controller that estimates disk actuator head position and velocity for odd sample times by first calculating head position as for a regular, expected sample time, and then alters the estimate for an odd sample time using a simplified estimation function. By forcing the odd sample time to a known predetermined or measured interval, by skipping a disk control signal computation interval, the simplified odd sample time estimation can be used. This makes the disclosed technique useful when sampling times are not regular, and when the change in one sample time interval is not related to the change in the next sample time interval.

The present invention has been described above in terms of a presently preferred embodiment so that an understanding of the present invention can be conveyed. There are, however, many configurations for disk drive control systems not specifically described herein but with which the present invention is applicable. The present invention should therefore not be seen as limited to the particular embodiments described herein, but rather, it should be understood that the present invention has wide applicability with respect to disk drive control systems generally. All modifications, variations, or equivalent arrangements and implementations that are within the scope of the attached claims should therefore be considered within the scope of the invention.

We claim:

1. A method of controlling head position in a direct access storage device, the method comprising the steps of:
   transducing a servo pattern recorded in tracks on the storage media and producing a readback signal that indicates the head position relative to the storage media tracks;
   receiving a readback signal sample according to a first sample time interval and demodulating the readback signal sample to produce measured position information of the head;
   producing an estimate of head position and velocity corresponding to the head position for a next sample time interval; and
   modifying the measured position information of the head with the estimate of head position and velocity to produce a head control signal that controls the position of the head over the storage material;
   wherein the step of producing an estimate comprises the steps of:
      initiating an odd sample time interval having a duration that is longer than a normal sample time interval;
      estimating head position and velocity with a simplified estimation function that ignores terms that are otherwise calculated.

2. A method as defined in claim 1, wherein the odd sample time interval is a predetermined time interval.

3. A method as defined in claim 1, wherein the odd sample time interval is a measured time interval.

4. A method as defined in claim 1, wherein the step of initiating an odd sample time interval comprises skipping a normal sample time interval such that the odd sample time interval extends over more than one normal sample time interval.

5. A method as defined in claim 1, wherein the step of estimating includes using a simplified estimation function that calculates predicted head position using terms comprising prior predicted head position, prior predicted head velocity, the time by which the odd sample time interval is longer than a normal sample time interval, an acceleration factor, and the head control signal from the prior sample time interval.

6. A method as defined in claim 5, wherein the odd sample time interval is a predetermined time interval.

7. A method as defined in claim 5, wherein the odd sample time interval is a measured time interval.

8. A method as defined in claim 1, wherein the step of estimating includes using a simplified estimation function that calculates predicted head velocity using terms comprising prior predicted head velocity, the time by which the odd sample time interval is longer than a normal sample time interval, an acceleration factor, and the head control signal from the prior sample time interval.

9. A method as defined in claim 8, wherein the odd sample time interval is a predetermined time interval.

10. A method as defined in claim 8, wherein the odd sample time interval is a measured time interval.

11. A data storage system comprising:
    a magnetic storage medium having a servo pattern recorded on at least one servo track;
    drive means for moving the magnetic storage medium relative to a magnetic head assembly;
    a head assembly having at least one read head for reading a servo pattern recorded in the multiple tracks and generating therefrom a head readback signal;
    a servo assembly that is activated to position the head assembly relative to the magnetic storage medium; and
    a servo controller that receives a readback signal sample according to a first sample time interval and processes the readback signal sample to produce measured position information of the head, produces an estimate of head position and velocity corresponding to the head position for a next sample time interval, and modifies the measured position information of the head with the estimate of head position and velocity to produce a head control signal that controls the position of the head over the storage material;
    wherein the servo controller estimates head position and velocity by initiating an odd sample time interval having a duration that is longer than a normal sample time interval by a positive amount and then estimates head position and velocity with a simplified estimation function such that the servo controller ignores terms that it otherwise calculates.

12. A data storage system as defined in claim 11, wherein the servo controller initiates an odd sample time interval by skipping a normal sample time interval such that the odd sample time interval extends over more than one normal sample time interval.

13. A data storage system as defined in claim 11, wherein the servo controller uses a simplified estimation function such that it calculates predicted head position using terms comprising prior predicted head position, prior predicted head velocity, the time by which the odd sample time interval is longer than a normal sample time interval, an acceleration factor, and the head control signal from the prior sample time interval.

14. A data storage system as defined in claim 13, wherein the odd sample time interval is a predetermined time interval.

15. A data storage system as defined in claim 13, wherein the odd sample time interval is a measured time interval.

16. A data storage system as defined in claim 11, wherein the servo controller uses a simplified estimation function such that it calculates predicted head velocity using terms comprising prior predicted head velocity, the time by which the odd sample time interval is longer than a normal sample time interval, an acceleration factor, and the head control signal from the prior sample time interval.

17. A data storage system as defined in claim 16, wherein the odd sample time interval is a predetermined time interval.

18. A data storage system as defined in claim 16, wherein the odd sample time interval is a measured time interval.

19. A servo signal processor comprising:

a servo demodulator that receives a readback signal sample produced from a servo pattern transduced by a read head from a storage media in a direct access storage device such that the readback signal indicates the position of the read head relative to storage media tracks, wherein the readback signal sample corresponds to a first sample time interval, such that the servo demodulator demodulates the readback signal sample to produce measured position information of the read head; and a servo controller that receives the sampled readback signal and produces a servo control signal that controls movement of the read head over the storage media, and processes the readback signal sample to produce measured position information of the head, produce an estimate of head position and velocity corresponding to the head position for a next sample time interval, and modify the measured position information of the head with the estimate of head position and velocity to produce a head control signal that controls the position of the head over the storage material;

wherein the servo controller estimates head position and velocity by initiating an odd sample time interval having a duration that is longer than a normal sample time interval by a positive amount and then estimates head position and velocity with a simplified estimation function such that the servo controller ignores terms that it otherwise calculates.

20. A servo signal processor as defined in claim 19, wherein the servo controller initiates an odd sample time interval by skipping a normal sample time interval such that the odd sample time interval extends over more than one normal sample time interval.

21. A servo signal processor as defined in claim 19, wherein the servo controller uses a simplified estimation function such that it calculates predicted head position using terms comprising prior predicted head position, prior predicted head velocity, the time by which the odd sample time interval is longer than a normal sample time interval, an acceleration factor, and the head control signal from the prior sample time interval.

22. A servo signal processor as defined in claim 21, wherein the odd sample time interval is a predetermined time interval.

23. A servo signal processor as defined in claim 21, wherein the odd sample time interval is a measured time interval.

24. A servo signal processor as defined in claim 19, wherein the servo controller uses a simplified estimation function such that it calculates predicted head velocity using terms comprising prior predicted head velocity, the time by which the odd sample time interval is longer than a normal sample time interval, an acceleration factor, and the head control signal from the prior sample time interval.

25. A servo signal processor as defined in claim 24, wherein the odd sample time interval is a predetermined time interval.

26. A servo signal processor as defined in claim 24, wherein the odd sample time interval is a measured time interval.

* * * * *